United States Patent [19]

Nuckolls et al.

[11] 4,376,752

[45] Mar. 15, 1983

[54] FOAM ENCAPSULATED TARGETS

[75] Inventors: John H. Nuckolls; Albert R. Thiessen; Glen H. Dahlbacka, all of Livermore, Calif.

[73] Assignee: The United States of America as represented by the United States Department of Energy, Washington, D.C.

[21] Appl. No.: 609,639

[22] Filed: Sep. 2, 1975

[51] Int. Cl.³ .............................................. G21B 1/00
[52] U.S. Cl. .................................. 376/152; 376/151
[58] Field of Search .................. 176/1, 9; 260/2.5 M; 536/69, 76; 149/2; 106/122, 196; 264/49, 41, DIG. 13; 376/152, 103, 914, 151

[56] References Cited

U.S. PATENT DOCUMENTS

| | | | |
|---|---|---|---|
| 2,880,726 | 4/1959 | Stieg | 106/122 |
| 3,046,608 | 7/1962 | Grebby et al. | 106/122 |
| 3,055,297 | 9/1962 | Leeds | 106/122 |
| 3,198,677 | 8/1965 | Thomas | 149/2 |
| 3,303,097 | 2/1967 | Mallinckrodt | 176/1 |
| 3,306,862 | 2/1967 | Mageli et al. | 106/122 |
| 3,407,253 | 10/1968 | Yoshimura et al. | 264/DIG. 13 |
| 3,619,306 | 11/1971 | Berthmann | 149/2 |
| 3,773,573 | 11/1973 | Slykhouse | 149/2 |
| 3,849,528 | 11/1974 | Smith | 260/2.5 M |
| 3,852,224 | 12/1974 | Bridgeford | 106/122 |
| 3,883,626 | 5/1975 | Kamide et al. | 264/49 |
| 3,891,577 | 6/1975 | Kershaw et al. | 106/122 |
| 3,977,921 | 8/1976 | Chandler | 149/2 |
| 4,003,007 | 1/1977 | Stewart | 176/1 |
| 4,021,253 | 3/1977 | Budrich et al. | 501/12 |

FOREIGN PATENT DOCUMENTS

| | | | |
|---|---|---|---|
| 1033565 | 7/1953 | France | 176/1 |
| 841387 | 7/1960 | United Kingdom | 176/1 |
| 1195602 | 6/1970 | United Kingdom | 176/1 |

OTHER PUBLICATIONS

Science, vol. 188, 4/75, pp. 30–34.
Laser Focus, Dec. 1974, pp. 40, 41, 42, 43, by McCall et al.
UCRL-51609, 7/74, pp. 1–3, 6–12.
Rev. Sci. Instrum. vol. 45, No. 10, Oct. 1974, p. 1252 by Friedman et al.
UCRL-78474, 10/76, pp. 3–6.
UCRL-77725, 5/76, p. 4.
Nature, vol. 281, (10/11/79), pp. 414, 415.
Wall Street Journal, 8/20/79, pp. 1, 15.
Washington Post, 4/1/80, p. A5.
Chicago Tribune, 9/18/79.
Nuclear News, 4/80, pp. 77, 78.
John L. Emmett, "Statement on the LLL Laser Fusion Program Prepared for the JCAE Hearings on Fusion", 3/11/76, pp. 1–3, Fusion Power Report, 4/24/80, pp. 1–8.
UCRL-51708, 1/75, Rinde et al., pp. 1–10.
UCRL-75885, 10/28/74, pp. 1–15, by Dahlbacka et al.
Applied Optics, 2/72, vol. 11, No. 2, pp. 345–352 by Mead et al.
Nuclear Fusion, vol. 10, 1970, by Linhart, pp. 211, 212, 222, 225, 226.
J. of Physics D., vol. 7, No. 4, 3/1/74, pp. 261–262, by Lewkowicz.
1954 U.S. Code Congressional and Administrative News, pp. 3466, 3467, 3480, 3532.
Legislative History of the Atomic Energy Act of 1954, vol. II, pp. 1759, 2305, 2373, 2374.
Legislative History of the Atomic Energy Act of 1954, vol. III, pp. 2849, 2859.
Popular Science, Dec. 1976, pp. 66–71, 148, 150.
Laser Focus 5/77, p. 6.
Fortune, Dec. 1974, pp. 149, 152.
New York Times, Jan. 30, 1973, p. 21.
FTD-HT-66-422, 3/67, by Chao et al., pp. 1–9.
National Defense, May–Jun. 1975, pp. 467–470 by Stowe.
Nuclear News 3/78, pp. 30–35.
Nature, vol. 258, Dec. 1975, pp. 512–514, by Winterberg (II).
J. Physics D. Appl. Phys., vol. 9, 4/76, pp. L105–L108.
MATT-1050, 8/74, pp. 526–529.
Technology Review, 12/76, pp. 20–33, 39, 41–43.
Nuclear News, 5/75, pp. 79, 80.
Marwick, "Exploding Reactors for Power", 1/73, pp. 17–19, 26–28, 38.
ERDA-28, 1/75, pp. 1–3, 8–10.
NSENAO-58, No. 2, 10/75, pp. 107, 108, 118, 119.

Primary Examiner—Harvey E. Behrend
Attorney, Agent, or Firm—L. E. Carnahan; James E. Denny

[57] ABSTRACT

Foam encapsulated laser-fusion targets wherein a quantity of thermonuclear fuel is embedded in low density, microcellular foam which serves as an electron conduction channel for symmetrical implosion of the fuel by illumination of the target by one or more laser beams. The fuel, such as DT, is contained within a hollow shell constructed of glass, for example, with the foam having a cell size of preferably no greater than 2 $\mu$m, a density of 0.065 to $0.6 \times 10^3$ kg/m$^3$, and external diameter of less than 200 $\mu$m.

18 Claims, 8 Drawing Figures

FOAM ENCAPSULATED TARGETS

BACKGROUND OF THE INVENTION

The invention described herein was made in the course of, or under, Contract No. W-7405-ENG-48 with the United States Energy Research and Development Administration.

This invention relates to laser targets, particularly to laser-fusion targets, and more particularly to foam encapsulated targets for laser-fusion applications.

Laser-induced fusion has recently joined magnetic-confinement fusion as a prime prospect for generating controlled thermonuclear power. During the past few years much effort has been directed toward the development of fusion fuel targets or capsules and laser-initiated systems for causing implosion and thermonuclear burn of such capsules as exemplified by U.S. Pat. Nos. 3,489,645 issued Jan. 13, 1970 to J. W. Daiber et al; 3,624,239 issued Nov. 30, 1971 to A. P. Fraas; 3,723,246 issued Mar. 27, 1973 to M. J. Lubin; 3,723,703 issued Mar. 27, 1973 to K. W. Ehlers et al; and 3,762,992 issued Oct. 2, 1973 to J. C. Hedstrom. Compression of fuel capsules by laser to initiate thermonuclear fusion is described in detail, for example, by an article published in Nature, Vol. 239, No. 5368, pp. 139–142, Sept. 5, 1972 entitled "Laser Compression of Matter to Super-High Densities: Thermonuclear (CTR) Applications" by John H. Nuckolls et al, and an article published in Physics Today, August 1973 entitled "Laser-Induced Thermonuclear Fusion" by John H. Nuckolls et al. By way of example, copending U.S. patent application Ser. No. 306,237 filed Nov. 14, 1972 in the name of L. L. Wood et al now abandoned, discloses and claims a system for generating electricity by implosion of laser-fusion targets.

This invention, as set forth in the above-referenced U.S. Pat. No. 3,723,246 to M. J. Lubin, is useful in providing high temperature plasma. As recited in the Lubin patent at Column 2, lines 21–32, "this invention is useful in the wide variety of applications to which the heretofore known thermonuclear research reactors and/or plasmas have been used. For example, this invention is useful in producing freely expanding plasmas, and/or laser-target micro-explosions involving fusing nuclei. It is also useful in filling plasma into any of the heretofore known linear and/or closed plasma research reactors, such as stellarators, tokamaks, magnetic mirrors, and/or minimum B and/or minimum average B devices. In this regard, the plasma of this invention can be produced in situ or used for injection purposes." However, as will be understood by one skilled in the art, this invention is not limited to the above-mentioned uses, and this invention, as in the Lubin patent, can be used in other applications requiring targets, and/or high temperature plasmas. Thus, this invention can be used for providing space propulsion, neutron production, etc., as understood in the art, and/or it can be used in the fields of magneto hydro-dynamics or power production.

Also, recent efforts have been directed to the fabrication of laser-fusion targets or fuel capsules compatible with laser energy and cost requirements for commercial power production as described briefly in the above-cited Nature article and in greater detail in an article entitled "Spherical Hydrogen Targets for Laser-Produced Fusion" by I. Lewkowicz, J. Phys. D: Appl. Phys., Vol. 7, 1974. Also, copending U.S. patent application Ser. No. 446,066, now U.S. Pat. No. 3,907,477, filed Feb. 26, 1974 in the name of T. R. Jarboe et al disloses and claims a method and apparatus for fabricating laser-fusion targets, while articles entitled "Hydrogen Pellet Generation for Fusion Research" by C. D. Hendricks, "Production of Solid Pellets for Laser Initiated Target Plasma in BBII" by A. L. Hunt et al, and "Hollow Hydrogen Shells for Laser-Fusion Targets" by C. D. Hendricks et al published in the Bulletin of the American Physical Society, Series II, Vol. 19, October 1974, pages 915, 963, and 927, respectively, are directed to fabrication of laser-fusion targets.

The success of any laser fusion system for the production of useful power depends critically on the production of suitable targets of fuel capsules which must satisfy a number of requirements in addition to low fabrication cost. Of critical importance to achieving sufficiently high energy gain are the effects of plasma instabilities, fluid instabilities, and the symmetry of the implosion. Thus, the target must have characteristics such as material composition, structure, and surface finish which are tailored to the laser pulse length, energy, peak and average power, and pulse shape.

The initial phase of a laser-driven implosion is the formation of an atmosphere surrounding the target, and thus efforts have been directed to various target configurations which are capable of producing this atmosphere, as well as other means such as gas injection, ablating of the explosive-chamber wall surfaces, etc. which produce a desired atmosphere about the target or fuel capsule. Copending U.S. patent application Ser. No. 609,841, filed Sept. 2,1975, entitled "Laser-Fusion Targets for Reactors" in the name of John H. Nuckolls and assigned to the assignee of this application, exemplifies laser target configurations capable of producing the desired atmosphere.

SUMMARY OF THE INVENTION

The present invention is directed to laser targets wherein the required atmosphere is provided by a layer of low density, microcellular foam surrounding a fusion fuel containing hollow shell. The hollow shell containing the fuel, such as DT, may be composed of glass, for example, and constitute a pusher for enhancing the implosion process when the foam is illuminated by energy from one or more laser beams. The foam encapsulated targets are fabricated in various configurations to meet the above-described requirements as to the laser energy and number of laser beams utilized. The targets, for example, may be composed of a hollow shell of approximately 50–100 $\mu$m diameter enclosed in a foam layer having an external diameter of 60–200 $\mu$m diameter and for test purposes the targets being mounted on a support or stalk to mount same in an evacuated chamber for laser irradiation thereof. The foam is preferably of a cell size less than 2 $\mu$m and density of 0.065 to $0.16 \times 10^3$ kg/m$^3$. The foam, for example, may be of the type described and claimed in copending U.S. patent application Ser. No. 609,641, filed Sept. 2, 1975, now U.S. Pat. No. 4,012,265 issued Mar. 15, 1977, in the name of James A. Rinde, assigned to the assignee of this application. The hollow fuel containing shells may, for example, be encapsulated in foam in accordance with encapsulation methods described and claimed in copending U.S. patent application Ser. No. 609,642, filed Sept. 2, 1975, now U.S. Pat. No. 4,021,280 issued May 3, 1977, in the name of James A. Rinde et al; and/or copending application Ser. No. 609,640, filed Sept. 2, 1975, now U.S. Pat. No. 4,034,032 issued July 5, 1977, in the name of Charles D. Hendricks, each assigned to the assignee of this application.

Therefore, it is an object of the invention to provide foam encapsulated laser targets.

A further object of the invention is to provide a laser target composed of a fusion fuel containing hollow shells encapsulated in low density, microcellular foam.

Another object of the invention is to provide a foam encapsulated laser target composed of a hollow glass shell containing DT and surrounded by a layer of low density microcellular foam.

Another object of the invention is to provide a target for laser-fusion applications, wherein a quantity of fusion fuel is encapsulated in low density, microcellular foam having a cell size of not greater than about 2 $\mu$m and a density of 0.065 to $0.6 \times 10^3$ kg/m$^3$, with an external diameter of less than about 200 $\mu$m.

Other objects of the invention will become apparent from the following description and accompanying drawings.

DESCRIPTION OF THE INVENTION

Laser initiated, inertially confined, thermonuclear burn has been described in the above-referenced Nature article for laser systems utilizing an optimally programmed temperal pulse. The essential characteristics of this process are compression of the thermonuclear fuel to densities on the order of 1000 g/cc, shock and compressive heating of the ions at the center of convergence to temperatures of 10 keV and thermonuclear bootstrapping of the fuel by redeposition of the burn produced alpha particles to propagate the reaction from the center of convergence. The principal difficulties in achieving these conditions are due to plasma instabilities that tend to preheat the target and make the DT more difficult to compress; and due to hydrodynamic instabilities such as the Rayleigh Taylor instability that tend to destroy the symmetry of the implosion.

Figure 1:
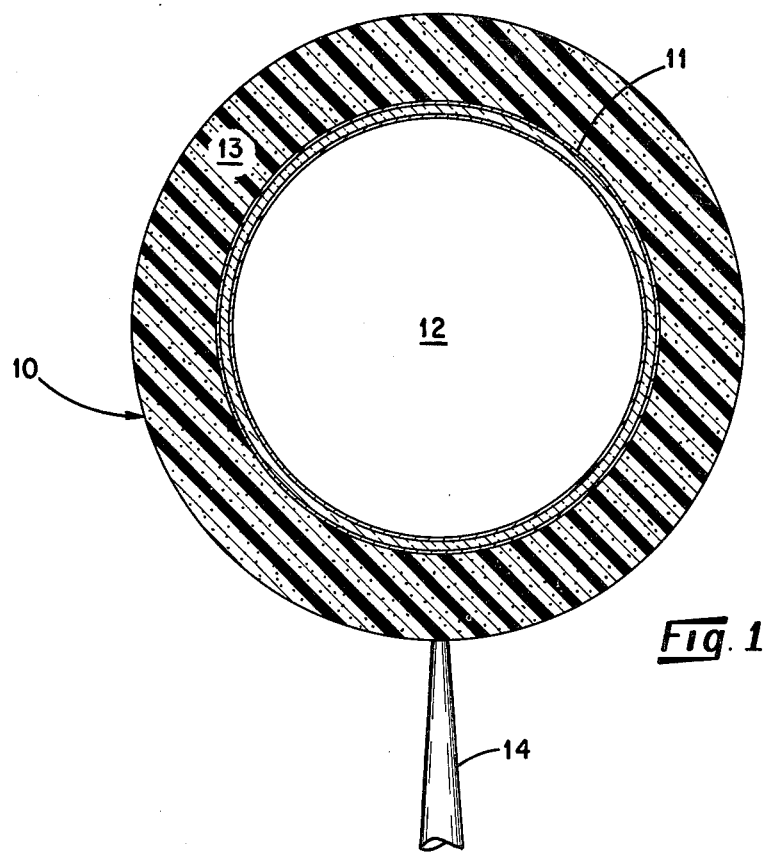
FIG. 1 is a partial cross-sectional view of a spherical embodiment of a foam encapsulated laser target.

Compressions to on the order of 1-10 g/cc and to thermonuclear temperatures can be achieved in systems that are essentially Rayleigh Taylor stable with present day systems. The main purpose of experiments with these capsules is testing of our theoretical understanding and computational models. In these systems an optimally chosen, low density DT fuel ($\sim 10^{-2}$ g/cc) is confined by a spherical shell of a low Z material that is at a considerably higher density than the fuel. FIG. 1 illustrates a configuration of such a target or fuel capsule. The primary purpose of the shell is to contain the DT fuel prior to the implosion and to implode the DT fuel when suddenly heated by the laser.

Referring now to FIG. 1, the embodiment of the target, generally indicated at 10 is composed of a hollow spherical shell 11, constituting a pusher, of low Z (below about 15), medium density ($\sim 2$) material, such as glass (silica) for containment and to compress a quantity of low density fuel 12, such as deuterium-tritium (DT) having a density of ($\sim 0.01$ g/cc), shell 11 being surrounded by a layer 13 of low Z, low density ($\sim 0.1$ g/cc) plastic, such as cellulose acetate foam. The main function of the foam is to conduct energy around the capsule in order to improve the implosion symmetry. A secondary function is to increase the cross-sectional area of the target in order to minimize the laser focusing requirement and absorb more laser energy. For test purposes the target 10 is mounted on a stalk or support 14 of silica, for example, which supports the target in an evacuated test chamber during illumination by laser energy. For example, the inner diameter of the shell 11 is about 70-80 $\mu$m with a wall thickness of about 0.5-10 $\mu$m, and the foam layer has a thickness of about 10-100 $\mu$m and an external diameter of about 90-180 $\mu$m with a cell size about 0.3 to 2 $\mu$m and a density of 0.01-0.1 g/m$^3$ with the stalk 14 having a cross-section of less than about 5 $\mu$m at the point of intersection with the foam layer 13.

There are two principal physical processes operating in the fuel that tend to cool hot ions: ion conduction to the pusher and Coulomb coupling to the electrons in the fuel. In order to overcome these processes and heat the ions to thermonuclear temperatures, a certain minimum implosion velocity must be achieved.

Figure 2:
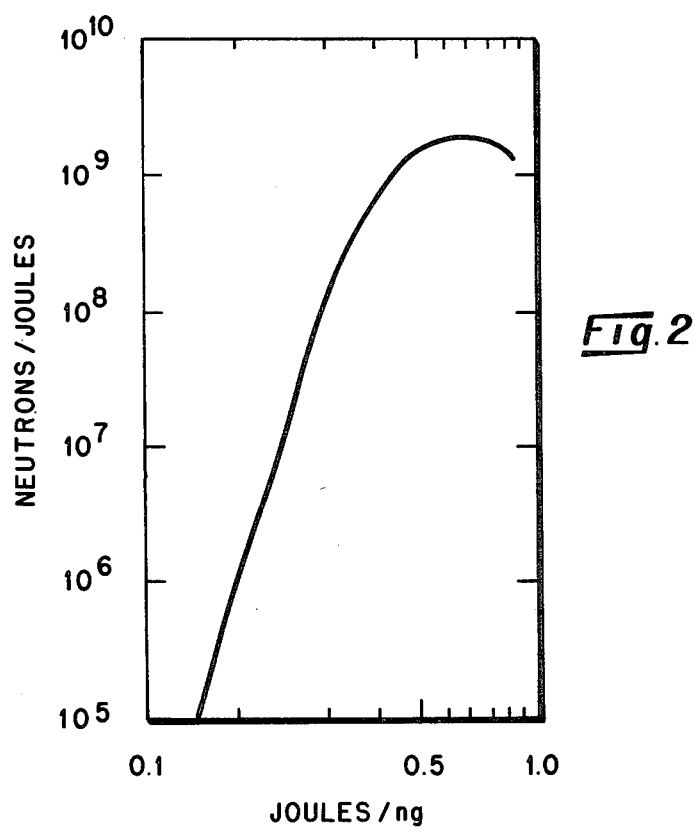
FIG. 2 is a graph illustrating the specific neutron yield as a function of the specific energy of a target containing 0.1 to 1 ngcf DT fuel.

The minimum implosion velocity implies two things. First, the velocity together with the capsule radius sets the time scale for the implosion and thus the time scale for the laser pulse ($\tau_\eta \lesssim v/r_o$, where $r_o$ is the initial radius of the system). Secondly, the velocity together with the capsule mass gets the energy that must be supplied to the target since the velocity achieved in roughly proportional to the square root of the temperature of the target. FIG. 2 is a plot of the specific neutron yield as a function of the specific energy of the target containing 0.1-1$\mu$ng of DT as computed by a computer code. The curve rises rapidly at the low specific energy end since the fusion temperature ($T_i$) is increasing, thereby increasing the neutron yield roughly as $T_i^5$ power, (which is the rate of increase of the Maxwell averaged thermonuclear cross section [$\sigma \bar{v}$] in the region of 1 keV). At higher specific energies the specific yield drops off since $\sigma \bar{v}$ is less steep and since ion conduction limits the temperature which can be achieved in the DT fuel. Also the laser heated electrons are so energetic that they do not couple efficiently to the target.

If the above conditions are met, then the pusher decompresses and explodes due to internal heating by electrons and x-rays. Consequently, the problems of Rayleigh Taylor hydrodynamic instability are alleviated.

Under these conditions, energy is conducted around the capsule in much less than the implosion time. Then, symmetry can be achieved using one laser.

Figure 3:
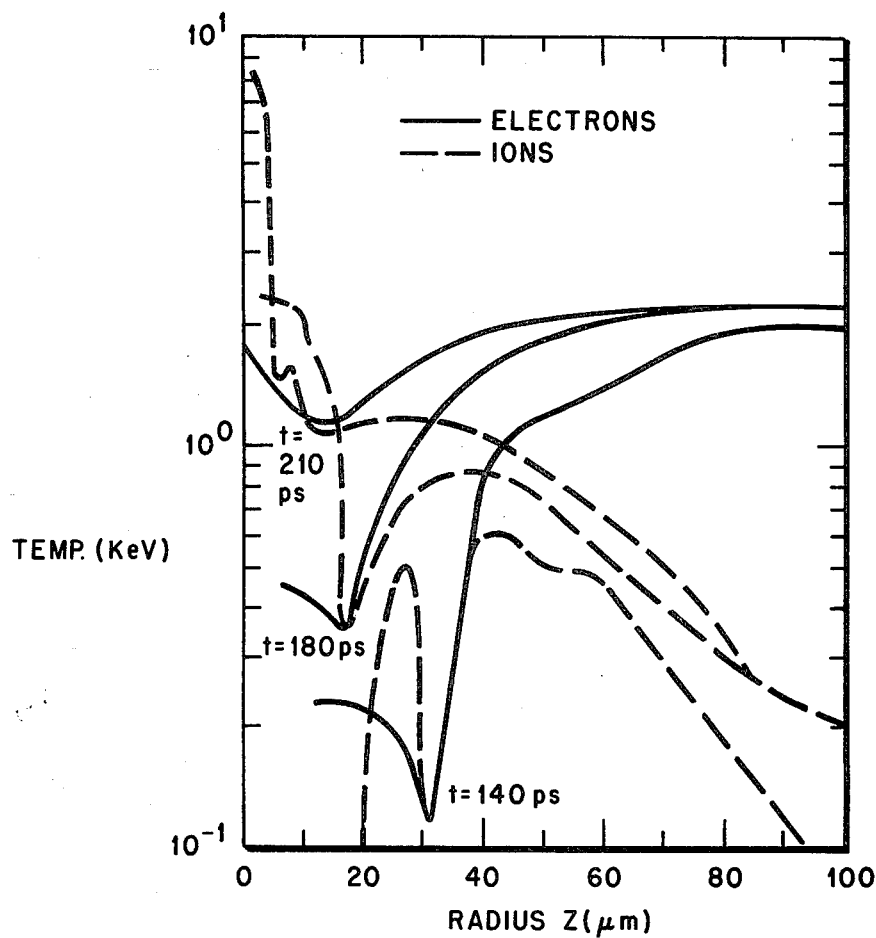
FIG. 3 is a graph showing the computer calculated electron and ion temperatures as a function of radius at three times during an implosion of a target similar to the FIG. 1 embodiment.

FIG. 3 shows the electron and ion temperatures as a function of radius at three different times during an implosion of a target like that in FIG. 1. The source was a 100 ps FWHM Gaussian pulse of 50 joules. At t=140 ps 10 joules of the energy has been absorbed and the electron temperature around the critical density at 80μ is approaching 2 keV. In the low density exterior the ions are decoupled from the electrons and as one gets into the high density area of the pusher ($\rho \sim 1.1$ g/cc) the electrons and ions are coupled together. In the fuel, a shock is heating the ions ahead of the pusher fuel interface. Since the DT is at a low density the ions are decoupled from the electrons.

At 180 ps, the laser intensity is a maximum and the pusher has moved into 15μ and has a density of 0.9 g/cc. The initial shock has arrived at the center and set a temperature of 2 keV throughout most of the fuel. The remaining motion of the pusher will compress this gas so at 210 ps the ions are heated to $\sim 7$ keV and the pusher has imploded to 5μ and 1.3 g/cc which represents a compression ratio of 500. At the end of this implosion calculation the electron temperature become nearly isothermal.

Several options are available for the illumination of the target in FIG. 1. It may be asymmetrically irradiated by one or two oppositely directed laser beams focussed by simple lenses (e.g., F/0.6, F/7 or F/2), or the target may be more symmetrically illuminated by a confocal ellipse system.

As pointed out above, the addition of a low density, low Z material, such as a plastic foam, around the outside of the pusher or fuel containing shell substantially increases the electron mean free path lengths between the region of the critical density and the pusher, and thereby smooth spatial variations in the laser source. FIGS. 4–8 illustrate, like the FIG. 1 embodiment, foam encapsulated targets configured and constructed to meet the laser pulse length, energy, peak and average power, and pulse shape requirements thereby having the characteristics required for laser-fusion targets.

Figure 4:
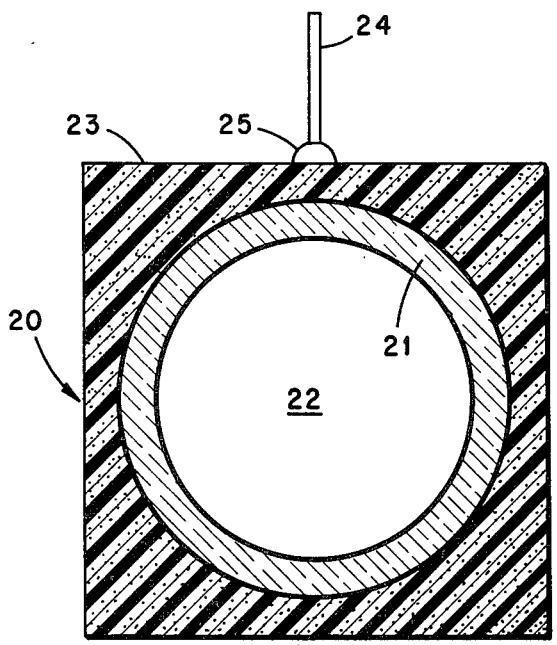
FIG. 4 is a cross-sectional view of another embodiment of a target having a square external foam cross-section.

FIG. 4 illustrates an embodiment wherein the foam is of a square cross-section and thus may be of rectangular or cubical overall configuration. The FIG. 4 target, generally indicated at 20, comprises a hollow shell or pusher layer 21 of 76% silica glass with a wall thickness of about 0.5–1 μm and an outer diameter of 70–80 μm, for example, containing fuel 22, such as DT in equal molar composition. Shell or pusher 21 is surrounded by a plastic foam 23 having a 1 μm cell size, for example, and a cross section of 90–100 μm. To support the target 20 for test purposes, a fiber or stalk 24 of silica having a cross-section of less than 5 μm, for example, is glued or otherwise secured as indicated at 25 to foam 23 which suspends the target 20 in an evacuated chamber for illumination by one or more laser beams.

Figure 5:
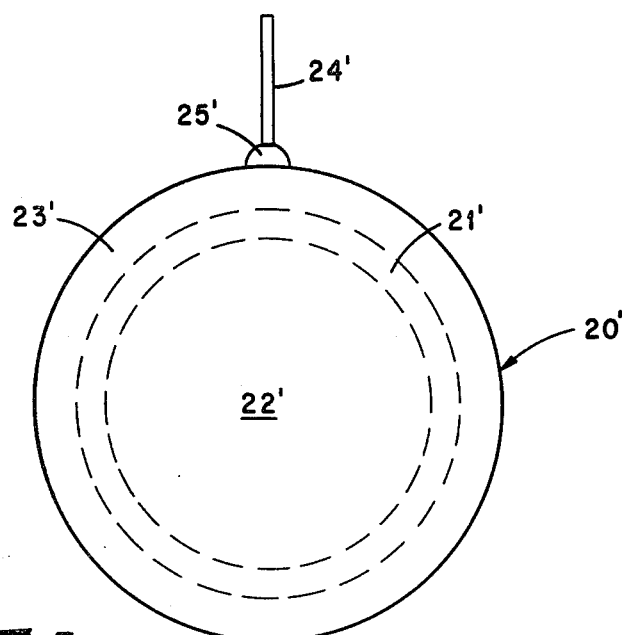
FIG. 5 is an embodiment similar to FIG. 4 except the foam is of a spherical configuration.

FIG. 5 is similar in construction to the FIG. 4 embodiment except that the encapsulating foam is in a circular cross-sectional configuration, with the overall target being of either a spherical or cylindrical shape, depending on the application thereof. Accordingly, each of the components of FIG. 5 are given reference numerals similar to FIG. 4, with the parameters thereof being the same.

Figure 6:
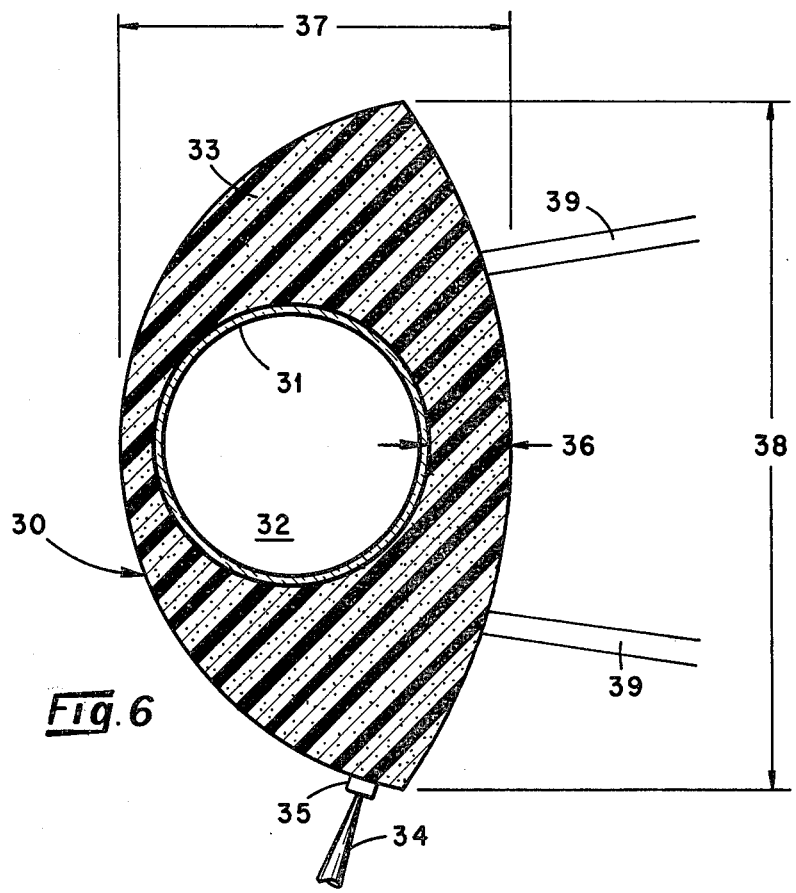
FIG. 6 is a cross-sectional view of an encapsulated target having a near hemispherical configuration.

FIG. 6 illustrated a near hemispherical foam encapsulated target indicated generally at 30 and comprising a hollow shell or pusher layer 31 containing fuel 32, encapsulated in foam 33 and secured to a stalk or support 34 as indicated at 35. For example, shell 31 is constructed of glass having an outer diameter of 44 μm and wall thickness of 0.6 μm, fuel 32 id composed of DT having a density of $2 \times 10^{-3}$ gm/cm$^3$, foam 33 is composed of cellulose acetate and has a density of $8 \times 10^{-2}$ gm/cm$^3$ with a cell size of less than 2 μm. Foam 33 is configurated such that dimension 36 is 10 μm, dimension 37 is 60 μm, and dimension 38 is 90 μm. Stalk 34 is of silica with a cross-section less than 2 μm at the point of contact with foam 33. The target 30 is illuminated by a laser beam 39 as indicated by legend. For purpose of description, the following parameters illustrate those obtained in experimental tests of the FIG. 6 target:

Laser Energy = 18.0 Joules
Energy Absorbed = 2.8 Joules
Laser Pulse Width = 113 Picoseconds
Target Mass = 23 Milligrams
Fuel Mass = 0.08 Milligrams
Neutron Yield = 200

Figure 7:
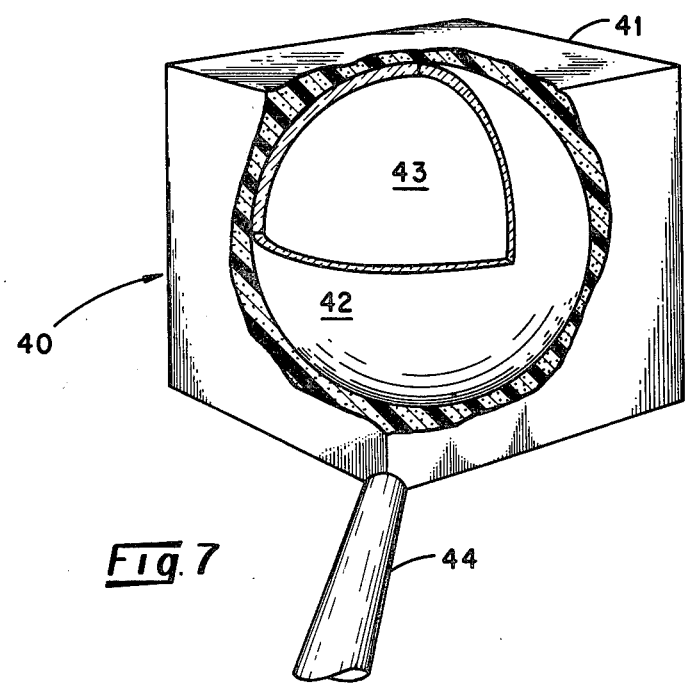
FIG. 7 illustrates a cube-shaped foam encapsulated target for six sided illumination.

FIG. 7 illustrates a six sided target generally indicated at 40, for illumination by six laser beams and comprises a cube of foam 41 having a hollow shell or pusher 42 centrally located therein and containing a quantity of fuel 43. Foam cube 41 is suspended at one corner thereof by a stalk or support 44 glued or otherwise secured to the foam. As readily seen the target 40 is positioned such that laser beams, not shown, may be directed on each of the six sides of the foam cube 41 resulting in a highly symmetrical implosion of the target. By way of example, the foam cube 41 has side dimensions of 100 μm × 100 μm × 100 μm and a thickness of 10 μm from the shell 42 to the center of each side, with a density of 0.1 g/cc; the hollow shell 42 being made of silica, 80 μm in diameter and wall thickness of 1 μm; the fuel 43 being DT gas at a density of $10^{-3}$ g/cc; and stalk 44 being made of a glass rod with a 2 μm diameter at the point of contact.

Figure 8:
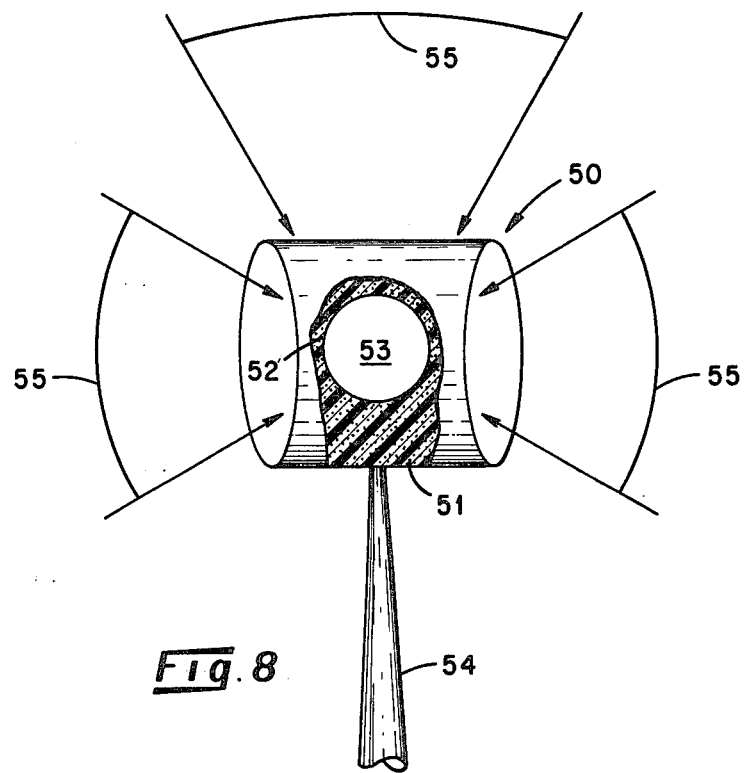
FIG. 8 illustrates a cylindrical foam encapsulated target configuration designed for three beam illumination.

FIG. 8 illustrates a cylindrical target generally indicated at 50 for a three laser beam application and comprises a cylinder of foam 51 which encapsulates a hollow shell or pusher 52 containing fuel 53, and is mounted on a stalk or support 54. As in the previous embodiments, the shell 52 may be made of glass and the fuel 53 composed of DT, with the stalk 54 being glass. The densities, parameters, etc. of the FIG. 8 embodiment may be similar to the above-described embodiments.

Again it is pointed out that the foam may vary in cross-section from about 60 to 200 μm, the fuel containing shell from about 50 to 100 μm in diameter with thickness of the wall varying from about 0.5–1 μm. The encapsulating foam is preferably of the type, such as described in the above-referenced pending application Ser. No. 609,641, now U.S. Pat. No. 4,012,265, having a cell size of about 0.3 to 2 μm and density of 0.065 to $0.6 \times 10^3$ kg/m$^3$.

While the fuel has been described above as DT, it may also be composed of LiD, LiDT, or D, with the shell, in addition to glass being composed of aluminum, carbon, beryllium or magnesium, each material having parameters, such as densities, mass, thickness, etc. compatible with the laser energy being utilized. This target may also be imploded by the axial beams or the cylindrical beam may be replaced by several conical beams.

It has thus been shown that the present invention provides foam encapsulated targets for laser fusion applications which can be produced by either extrusion of mold encapsulation processes, and configured for most efficient laser energy applications thereto.

While particular embodiments and parameters have been illustrated or described, modifications will become apparent to those skilled in the art, and it is intended to cover in the appended claims all such modifications as come within the spirit and scope of the invention.

We claim:

1. A foam encapsulated target comprising: a hollow substantially spherical shell constructed from a nonexplosive material and containing a quantity of fuel, said shell being encapsulated in nonexplosive foam composed of material having a density in the range of 0.065 to $0.6 \times 10^3$ kg/m$^3$ and a cell size of about 0.3 to 2 $\mu$m.

2. The target defined in claim 1, wherein said hollow shell has a diameter ranging from about 50 to 100 $\mu$m and a wall thickness of about 0.1 to 10 $\mu$m.

3. The target defined in claim 2, wherein said hollow shell is composed of material selected from the group consisting of glass, carbon, aluminum, beryllium, and magnesium.

4. The target defined in claim 3, wherein said hollow shell material is glass.

5. The target defined in claim 1, wherein said fusion fuel is selected from the group consisting of DT, LiD, LiDT, and D.

6. The target defined in claim 1, wherein said fusion fuel is composed of gaseous DT.

7. The target defined in claim 1, wherein said foam has a cross-section ranging from about 60 to 200 $\mu$m.

8. The target defined in claim 1, wherein said foam is configured to have a substantially square cross section.

9. The target defined in claim 1, wherein said foam is substantially spherical in shape.

10. The target defined in claim 1, wherein said foam is substantially cylindrical in shape.

11. The target defined in claim 1, wherein said foam is substantially cubical in shape.

12. The target defined in claim 1, wherein said foam is in a near hemispherical configuration.

13. The target defined in claim 1, wherein said foam is of a longitudinally extending cylindrical configuration having ends thereof cut an an angle.

14. The target defined in claim 1, additionally including a support member attached to said foam for fixedly positioning the target in an associated evacuated chamber for illumination by at least one laser beam.

15. A target comprising: a hollow substantially spherical shell having a diameter ranging from about 50 to 100 $\mu$m and a wall thickness of 0.1 to 1 $\mu$m, said shell being composed of a non-explosive material, said shell containing a quantity of fuel selected from the group consisting of DT, LiD, LiDT, and D, and being incapsulated in a non-explosive foam comprising a material having a density in the range of 0.065 to $0.6 \times 10^3$ kg/m$^3$ and a cell size of about 0.3–2 $\mu$m.

16. The target defined in claims 1 or 15, wherein said foam is composed of cellulose acetate.

17. The target defined in claim 15, wherein said foam has a thickness of about 10–100 $\mu$m.

18. The target defined in claim 16, wherein said foam is configured about said hollow shell in a general hemispherical shape, said hollow shell being positioned within said foam so as to have at least three dimensions, a first of said dimensions being about 10 $\mu$m thick, a second of said dimensions being about 60 $\mu$m thick, and a third of said dimensions being about 90 $\mu$m thick.

* * * * *